(12) United States Patent
Swain et al.

(10) Patent No.: US 11,632,361 B2
(45) Date of Patent: Apr. 18, 2023

(54) COMBINED AUTHENTICATION AND CONNECTION ESTABLISHMENT FOR A COMMUNICATION CHANNEL

(71) Applicant: Citrix Systems, Inc., Ft. Lauderdale, FL (US)

(72) Inventors: Santosh Kumar Swain, Cuttack (IN); Gajula Rambabu, East Godavari (IN)

( * ) Notice: Subject to any disclaimer, the term of this patent is extended or adjusted under 35 U.S.C. 154(b) by 223 days.

(21) Appl. No.: 17/062,130

(22) Filed: Oct. 2, 2020

(65) Prior Publication Data
US 2022/0109663 A1 Apr. 7, 2022

(51) Int. Cl.
*H04L 9/40* (2022.01)
*H04L 12/66* (2006.01)
*H04L 69/164* (2022.01)
*H04L 69/24* (2022.01)

(52) U.S. Cl.
CPC ............ *H04L 63/08* (2013.01); *H04L 12/66* (2013.01); *H04L 63/166* (2013.01); *H04L 69/164* (2013.01); *H04L 69/24* (2013.01)

(58) Field of Classification Search
CPC ....... H04L 63/08; H04L 12/66; H04L 63/166; H04L 69/164; H04L 69/24; H04L 63/0884; G06F 21/31
See application file for complete search history.

(56) References Cited

U.S. PATENT DOCUMENTS

| | | | | |
|---|---|---|---|---|
| 10,785,021 | B1 * | 9/2020 | Prabhat | H04L 9/0863 |
| 2007/0006285 | A1 * | 1/2007 | Stafie | H04L 63/08 |
| | | | | 726/4 |
| 2013/0133045 | A1 * | 5/2013 | Hayes | H04L 63/08 |
| | | | | 726/5 |
| 2015/0341453 | A1 * | 11/2015 | Miller | H04W 4/21 |
| | | | | 709/204 |
| 2019/0278616 | A1 | 9/2019 | Momchilov et al. | |
| 2020/0106778 | A1 * | 4/2020 | Park | H04L 63/108 |
| 2020/0302037 | A1 * | 9/2020 | Kawamura | H04L 63/083 |

(Continued)

FOREIGN PATENT DOCUMENTS

WO  2017201399 A1  11/2017

OTHER PUBLICATIONS

Siriwardena Prabath, "Nuts and Bolts of Transport Layer Security (TLS)", Facilelogin, Jul. 2, 2017, Retrieved from the Internet: URL:https://medium.facilelogin.com/nuts-and-bolts-of-transport-layer-security-tls-2c5af298c4be [retrieved on Nov. 8, 2021] 24 pages.

(Continued)

*Primary Examiner* — Mohamed A. Wasel

(57) ABSTRACT

A computer system to establish a connection between a client device and a server device is provided. The computer system includes a gateway device that receives a message from the client device. The message includes a connection request and authentication information. The gateway device extracts the authentication information and the connection request from the message. The gateway device authenticates the client device, based on the authentication information. Subsequently, the gateway device transmits the connection request to the server device. Thereafter, the gateway device acts as a transparent proxy between the client and server devices, while the client and server devices engage in a handshake process to establish the connection between the client and server devices.

20 Claims, 5 Drawing Sheets

(56) References Cited

U.S. PATENT DOCUMENTS

2021/0314260 A1* 10/2021 Hayes ................. H04L 63/0236
2022/0104112 A1*  3/2022 Rajput ................ H04W 12/122

OTHER PUBLICATIONS

Written Opinion dated Nov. 9, 2021 for International Patent Application No. PCT/US2021/045716, 12 pages.
International Search Report dated Nov. 9, 2021 for International Patent Application No. PCT/US2021/045716, 4 pages.
Gu, Yunhong, "UDT: UDP-based Data Transfer Protocol draft-gg-udt-03.txt", University of Illinois at Chicago, Internet Engineering Task Force, Internet Draft, Oct. 12, 2010, 19 pages.

* cited by examiner

COMBINED AUTHENTICATION AND CONNECTION ESTABLISHMENT FOR A COMMUNICATION CHANNEL

BACKGROUND

Virtual workspace (VW) systems are complex and include a variety of hardware and software components that collectively provide users with high performance, secure execution environments. In VW systems, a client computing device executing a virtualization client application communicates with a server computing device executing a virtualization agent. Often times, such communication between the client and server computing devices are via a gateway computing device, using a proxy communication channel.

SUMMARY

One example embodiment provides a method including receiving, by a computing device, a message from a client device, the message including a connection request to establish the connection and authentication information. The method further includes extracting, by the computing device, the authentication information and the connection request from the message. The method further includes authenticating, by the computing device, a user of the client device based on the authentication information, and transmitting, by the computing device subsequent to authenticating the user, the connection request to a server device. The method further includes facilitating, by the computing device subsequent to the transmission of the connection request to the server device, establishment of the connection between the client device and the server device. In an example, the connection request is a handshake request, with the authentication information included in a control block that is appended to the handshake request. In an example, the computing device is a gateway, and the method further includes exchanging, subsequent to establishment of the connection, data between the client device and the server device via the gateway over the connection, such that the gateway acts as a proxy in the connection between the client device and the server device. In an example, facilitating establishment of the connection includes subsequent to transmitting the connection request to the server device, receiving, by the computing device, a connection response from the server device; and transmitting, by the computing device, the connection response to the client device. In an example, the connection response comprises a cookie value and facilitating establishment of the connection further includes forwarding, by the computing device subsequent to transmitting the connection response, a capability negotiation request from the client device to the server device, the capability negotiation request including a cookie that is generated by the client device based on the cookie value; and forwarding, by the computing device, a capability negotiation response from the server device to the client device, the capability negotiation response including one or more parameters associated with the connection between the client device and the server device. In an example, facilitating establishment of the connection includes facilitating communication capability negotiation between the client device and the server device. In an example, the connection request comprises one or more of: a request body specifying that the connection request is a handshake request, a field storing a value specifying one or more version numbers of a transport protocol supported by the client device, a field storing a value specifying a socket type of the client device, a field storing a value specifying an initial packet sequence, a field storing a value specifying a maximum packet size supported by the client device, a field storing a value specifying a maximum flow window size supported by the client device, a field storing a value specifying a connection type supported by the client device, a field storing a value specifying a socket in the client device, and a field storing a value specifying a cookie, and a field storing a value specifying an Internet Protocol (IP) address of a socket in the client device. In an example, authenticating the client device includes transmitting, by the computing device, an authentication request including the authentication information to an authentication device, wherein the authentication device authenticates a user of the client device based on the authentication information; and receiving, by the computing device and from the authentication device, an authentication response confirming the authentication. In an example, a virtualization agent being executed within the server device and a virtualization client application being executed within the client device is to communicate over the established connection, to maintain a virtual workspace within the client device. In an example, the connection request comprises a first number of bits of the message; the authentication information comprises a second number of bits of the message; the first number and the second number are positive integers; and extracting the authentication information and the connection request from the message comprises removing the second number of bits from the message. In an example, the connection is based on a transport protocol comprising User Datagram Protocol-based Data Transfer Protocol. In an example, the connection is based on Enlightened Data Transport protocol.

Another example embodiment provides a computer system including a client device comprising a network interface; a memory to store instructions; and one or more processors coupled to the memory and the network interface, the one or more processors configured to generate a handshake message that comprises (i) a handshake request to establish a connection, and (ii) a control block appended to the handshake request, the control block including an authentication token, and cause transmission of the handshake message, including the handshake request and the control block, to a gateway device. In an example, the computer system further includes the gateway device comprising another network interface, another memory, and another one or more processors coupled to the other network interface and the other memory, wherein the other one or more processors of the gateway device are configured to receive the handshake message from the client device, cause transmission of the authentication token from the handshake message to an authentication device, receive a response from the authentication device authenticating a user of the client device, cause transmission of the handshake request from the handshake message to a server device, receive a handshake response from the server device, and cause transmission of the handshake response to the client device. In an example, the other one or more processors of the gateway device are configured to establish, subsequent to transmission of the handshake response to the client device, a proxy channel between the client device and the server device for communication between the client device and the server device. In an example, the computer system further includes the server device, wherein the server device and the client device communicate over the proxy channel via the gateway. In an example, handshake request comprises one or more of: a request body identifying the handshake request, a field storing a value specifying one or more version numbers of a transport protocol supported by the client device, a field storing a value specifying a socket type of the client device, a field storing a value specifying an initial packet sequence, a field storing a value specifying a maximum packet size supported by the client device, a field storing a value specifying a maximum flow window size supported by the client device, a field storing a value specifying a connection type supported by the client device, a field storing a value specifying a socket in the client device, and a field storing a value specifying a cookie, and a field storing a value specifying an Internet Protocol (IP) address of a socket in the client device.

Yet another example embodiment provides a non-transitory computer readable medium storing processor executable instructions to establish a communication channel between a first device and a second device, the instructions including instructions to: receive, from the first device, a control packet comprising (i) a first section including one or more parameters of the first device for establishing the communication channel, and (ii) a second section including an authentication token; cause transmission of the authentication token to an authentication device; receive a response from the authentication device confirming an authentication; and cause transmission of the one or more parameters of the first device to the second device. In an example, the control packet is a first control packet, and wherein the instructions further comprise instructions to receive a second control packet from the second device, in response to transmission of the configuration parameters to the second device; and cause transmission of the second control packet to the first device. In an example, the non-transitory computer readable medium is included in a computing device, and wherein the instructions further comprise instructions to establish the communication channel between the first device and the second device, with the computing device acting as a proxy between the first and second devices, to forward data between the first and second devices over the communication channel.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
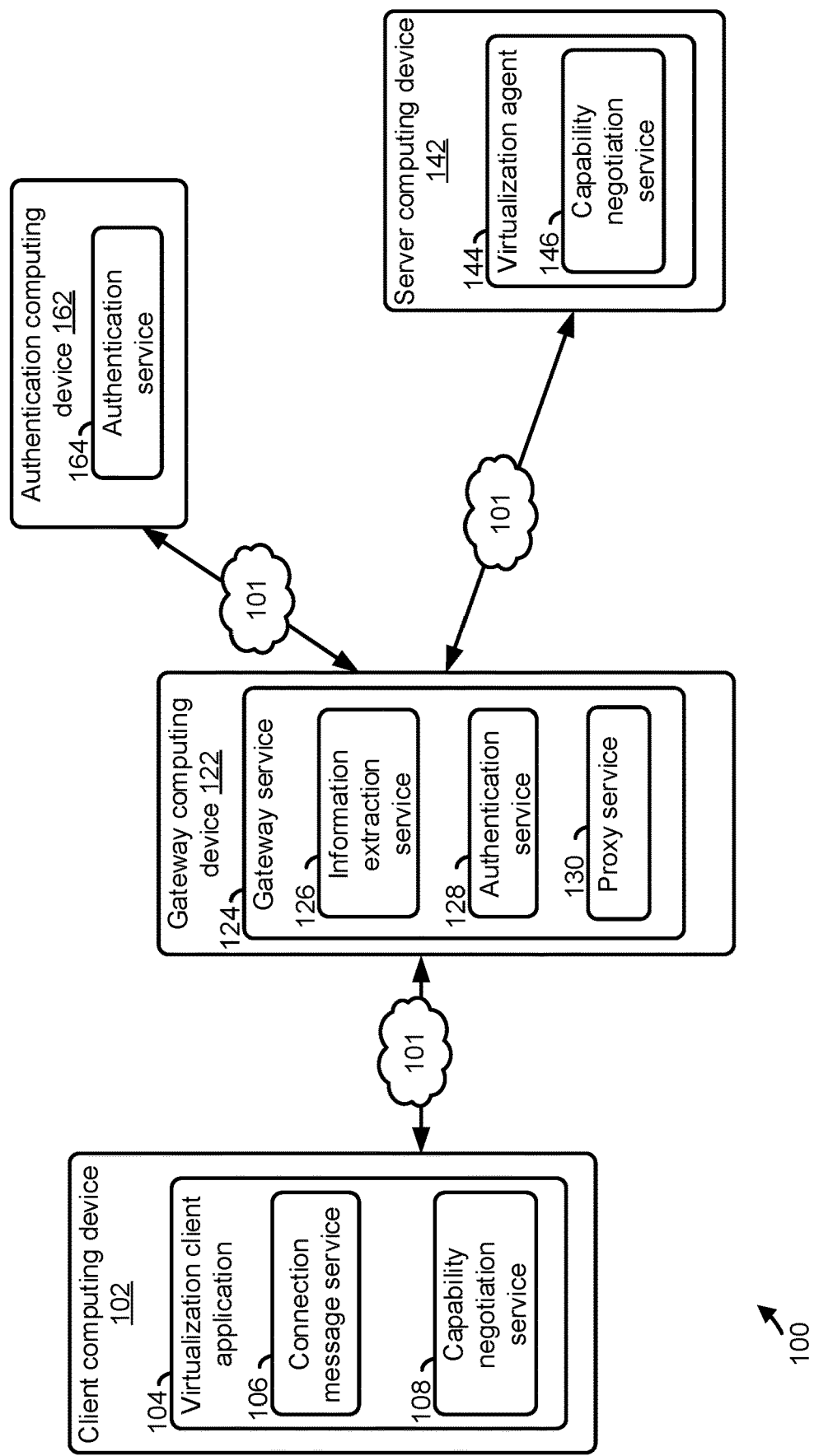
FIG. 1 is a block diagram schematically illustrating an architecture of an enhanced VW system configured to establish a communication channel between a virtualization client application and a virtualization agent, in accordance with an example of the present disclosure.

As summarized above, various examples described herein are directed to systems and methods that establish a communication channel between a virtualization client application being executed on a client computing device and a virtualization agent being executed on a server computing device. In some examples, a distributed computing system is configured to implement an enhanced VW system configured to establish communication channels between computing devices more efficiently than other VW systems. The enhanced VW system can, for example, efficiently establish communication channels between two nodes of the distributed computing system, such as the client computing device and the server computing device. For instance, in one example, the client computing device initiates a connection process by transmitting a connection message to a gateway computing device. The connection message is a handshake message in some examples. In certain examples, the connection message includes (i) a connection request and (ii) information for authenticating a user of the client computing device (also referred to as "authentication information"). Thus, in some examples, the connection request and authentication information are concatenated and embedded within the connection message. The connection request is a handshake request in some examples (e.g., the handshake request and the authentication information are embedded within the handshake message). The authentication information includes a Secure Ticket Authority (STA) ticket and/or an authentication token in some examples.

In certain examples, the gateway computing device, upon receiving the connection message, parses the connection message to extract the connection request and the authentication information. The gateway computing device facilitates authentication of the user of the client computing device using the authentication information. For instance, in some examples, the gateway computing device transmits the authentication information to an authentication service, such as an STA service. The authentication service validates the authentication information, thereby authenticating the user of the client computing device, and transmits an authentication response to the gateway service. Subsequently, the gateway computing device transmits the connection request to a server computing device executing the virtualization agent. The server computing device, upon receiving the connection message, starts communication capability negotiation with the client computing device, to negotiate the capability of the communication channel to be established between the client and server computing devices. In some examples, the gateway acts as a proxy during the capability negotiation process, as well as for subsequent data exchange between the client and server computing devices.

In contrast to the enhanced VW system discussed in various examples throughout this disclosure, in other communication systems, negotiation of communication capability and authentication are performed in three distinct phases: (i) a first phase in which communication capabilities are negotiated between the client application and the gateway service, (ii) a second phase in which the gateway service receives authentication information from the client application, transmits the authentication information to the authentication service, and receives an authentication response, and (iii) a third phase in which communication capabilities are negotiated between the gateway service and the virtualization agent. After the third phase is completed, the gateway service defines a data proxy channel between client application and the virtualization agent, which in then used to exchange data between the client application and the virtualization agent. There are several drawbacks of the above discussed three-phase negotiation and authentication processes performed by other communication systems. For example, the communication capability parameters negotiated by the client application with the gateway service can differ from the capability parameters being offered by the virtualization agent. Such differences can result in poor user experience, e.g., in terms of performance, and can even result in failure to launch the client application and/or failure to launch the communication channel between the client application and the virtualization agent. Furthermore, the client application is not able to get a transparent view of the virtualization agent, e.g., may be unaware of communication capabilities of the virtualization agent. Moreover, there is a delay or latency involved in establishing the complete end-to-end channel in some cases. For example, the virtualization agent can only discover during the above discussed third phase that channel establishment using the first communication protocol may not be feasible, and hence, fall back to a second communication protocol can occur only after the initiation of the third phase, which results in delay and latency in falling back to the second communication protocol if needed.

The channel establishment process executed by the enhanced VW system discussed in various examples of this disclosure has several advantages compared to the three-phase channel establishment processes described above. For instance, in various example processes described herein, the enhanced VW system utilizes an expanded connection message to establish communication channels. This expanded connection message is a concatenation of the connection request and the authentication information. Because the expanded connection message includes the authentication information, the gateway service can authenticate the user of the client computing device. For example, the gateway service transmits the authentication information to the authentication service and receives an authentication response, prior to initiation of the capability negotiation process between the client application and the virtualization agent. Once the user of the client application is authenticated early on in the channel establishment process, the client application and the virtualization agent directly communicate with one another, over the proxy channel, to negotiate communication capabilities and to complete the handshake process between the client application and the virtualization agent. Thus, the client application gets a transparent view of the virtualization agent during the negotiation process, and the gateway acts merely as a proxy. Furthermore, the client application and the virtualization agent detect each other's communication capability early on in the process (e.g., as compared to discovery in the third phase of the three-phase process described above). Thus, the enhanced VW system and the associated channel establishment process discussed with respect to FIGS. 1-4 and elsewhere in this disclosure can fall back to a second communication protocol, if needed, relatively early in the channel establishment process.

In some examples, the enhanced VW system establishes a communication channel that operates in accordance with an appropriate communication protocol, such as the Enlightened Data Transport (EDT) protocol developed by Citrix Systems® of Fort Lauderdale, Fla. in the United States. Compared to the Transmission Control Protocol (TCP) and the User Datagram Protocol (UDP), in some examples, the EDT protocol delivers a superior user experience on challenging long-haul wide area network (WAN) and Internet connections, dynamically responding to changing network conditions while maintaining high server scalability and efficient use of bandwidth. In some examples, EDT runs on UDP ports 1494 and 2598. UDP-based Data Transfer (UDT) protocol is an underlying protocol used for EDT. UDT is built upon UDP, adding congestion control and reliability control mechanisms. UDT is an application level, connection-oriented, duplex protocol that supports both reliable data streaming and partial reliable messaging. However, in some other examples, another suitable communication protocol may be used instead of EDT, such as UDT, UDP, Transmission Control Protocol (TCP), or the like, as will be discussed in further detail in turn.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Enhanced VW System

FIG. 1 illustrates an architecture of an enhanced VW system 100 in accordance with some examples. As shown in FIG. 1, the system 100 includes a client computing device 102 executing a virtualization client application 104, a gateway computing device 122 executing a gateway service 124, a server computing device 142 executing a virtualization agent 144, and an authentication computing device 162 executing an authentication service 164. Examples of individual ones of the computing devices 102, 122, 142, and/or 162 include a computing platform discussed herein later with respect to FIG. 5.

In some examples, the computing devices 102, 122, 142, and/or 162 are interconnected via one or more networks, generally labelled as networks 101 in FIG. 1. In some examples, one or more sections of the networks 101 are a wide area network (WAN), such as the Internet. In some other examples, at least part of the networks 101 may include private intranets, corporate networks, local area networks (LAN), metropolitan area networks (MAN), wireless networks, personal networks (PAN), and/or the like. The number of distinct networks 101 shown in FIG. 1 is merely for illustration purposes. As such, the number of distinct networks in any given example can vary from the number illustrated in FIG. 1.

In some examples, the virtualization client application 104 (also referred to herein as "client application 104") is installed in the client computing device 102 that hosts VW processes. Virtualization client applications, such as the client application 104 of FIG. 1, are installed on user endpoint computing devices (such as the client computing device 102). Such client applications are configured to provide users with access to virtual resources, such as virtual applications, virtual desktops, and virtual servers, that are hosted by computing devices (such as server computing device 142) physically distinct from the endpoint devices. In some instances, the client application 104 is simply a browser. Examples of virtualization client applications include the Citrix® Workspace application and the Citrix® Receiver application, both of which are commercially available from Citrix Systems of Fort Lauderdale, Fla. in the United States.

In some examples, the server computing device 142 executes a virtualization agent 144. Virtualization agents, such as the virtualization agent 144, are installed on server computing devices that host virtual resources, and are configured to manage access to the virtual resources. Examples of the virtualization agent 144 include the Citrix® virtual delivery agent (VDA).

In some examples, the gateway computing device 122 executes a gateway service 124. In some examples, the gateway computing device 122 is a Citrix® NetScaler® gateway, or a Citrix Gateway As A Service. In some examples, to allocate and connect to virtual resources, the client application 104 interoperates with the gateway service 124 via an API implemented by the gateway service 124. In one such interoperation, the client application 104 provides authentication credentials to the gateway service 124, and the gateway service 124 interoperates with the authentication service 164 executing on the authenticating computing device 162, to perform an authentication process, as will be discussed in further detail herein. In another interaction, the gateway service 124 facilitates capability negotiation between the client application 104 and the virtualization agent 144 when establishing a communication channel between the client application 104 and the virtualization agent 144, and further facilitates establishment of a proxy channel between the client application 104 and the virtualization agent 144, as will be discussed in further detail herein.

In some examples, the client application 104 provides a connection message service 106 and a capability negotiation service 108, although in some examples, these services can be merged, so that a single service provides the functionalities. Functionalities of the connection message service 106 and the capability negotiation service 108 will be discussed in further detail in turn. In some examples, the gateway service 124 provides an information extraction service 126, an authentication service 128, and a proxy service 130, each of which will be discussed in turn. In some examples, two or more of these services can be merged, so that a single service provides the functionalities of two or more such services. In some examples, the virtualization agent 144 provides capability negotiation service 146, which will be discussed in turn.

Enhanced VW Channel Establishment Processes

Citrix® HDX® technology is a set of capabilities that work together to deliver a high-definition user experience of virtual desktops and applications to client computing devices over any network from a data center. Citrix® HDX® has recently introduced the EDT protocol, which is a reliable-transmission UDP-based protocol. Compared to the TCP and the UDP, in some examples, the EDT delivers a superior user experience on challenging long-haul WAN and Internet connections, dynamically responding to changing network conditions while maintaining high server scalability and efficient use of bandwidth. In some examples, the EDT runs on UDP ports 1494 and 2598. UDT protocol is an underlying protocol that is used for communication using the EDT protocol (i.e., EDT is built upon UDT). UDT, on the other hand, is built upon UDP, adding congestion control and reliability control mechanisms. In some examples, the client application 104 and the virtualization agent 144 of system 100 communicate using EDT, although in some other examples, another appropriate communication protocol can be used, such as UDT or UDP, as will be discussed in further detail in turn.

In some examples, the client application 104 and the agent 144 may also employ adaptive transport technology for remote access. For example, by using adaptive transport, the virtual channels of the system 100 respond (e.g., automatically) to changing network conditions and/or communication capability of the client and/or server computing devices. For example, as will be discussed with respect to FIG. 2 herein, in response to detection of an incompatibility between communication capabilities of the client and the server computing devices for communication using EDT, the system 100 responds by falling back to communication using TCP. The communication between the client application 104 and the agent 144 intelligently switches the underlying protocol between EDT and TCP, to deliver better performance. Such adaptive transport improves data throughput for the proxy communication channel between the client application 104 and the agent 144. Merely as an example, the system 100 can be configured to use data transport over EDT as a primary protocol, with TCP as a fallback option. Independent Computing Architecture (ICA®) is a proprietary protocol for an application server system, designed by Citrix®. ICA supports adaptive transport technology, as described above, and enables adaptive switching between EDT and/or TCP for communication between client applications and virtualization agents. For example, the client application 104 and/or the agent 144 may decide to switch between EDT and TCP, as necessary. In some other examples, the system 100 utilizes, in addition to or instead of EDT and TCP, one or more other appropriate communication protocols, such as UDP, UDT, transport layer security (TLS), datagram transport layer security (DTLS), and/or the like. In some such examples, the system 100 uses one or more of the EDT, UDT, UDP, and/or TCP as a stand-alone protocol, or as a part of the adaptive transport technology.

Some examples of this disclosure are discussed with respect to establishing a communication channel or link between the client application 104 and the virtualization agent 144 of system 100 specifically using the EDT protocol. However, the teachings of this disclosure are not limited specifically towards the EDT protocol, and the teachings of this disclosure may also be applied to establish connections for another appropriate communication protocol as well, such as UDP, UDT, TCP, and/or the like.

Figure 2:
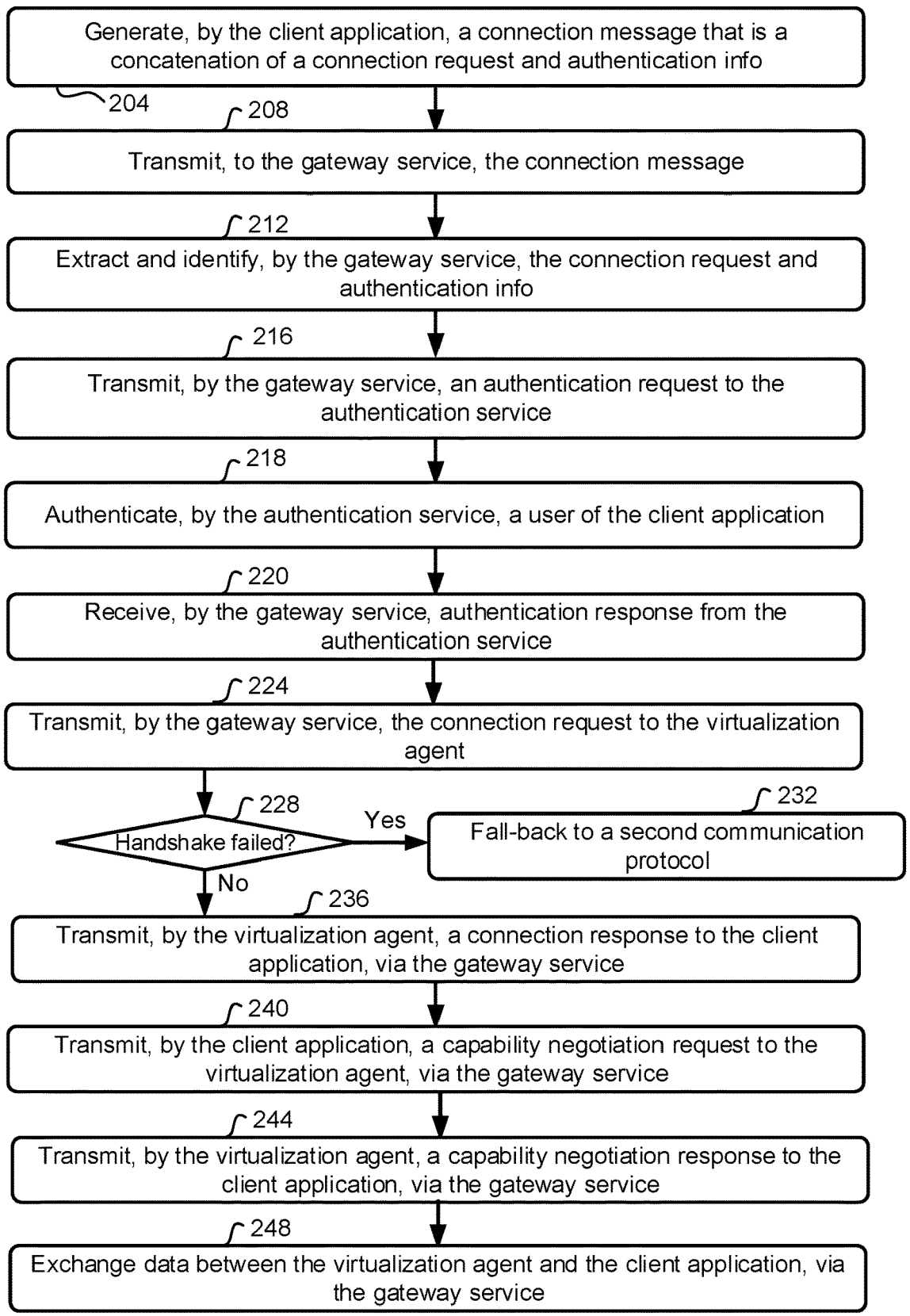
FIG. 2 is a flow diagram of a connection process in a VW system, in accordance with an example of the present disclosure.
Figure 3:
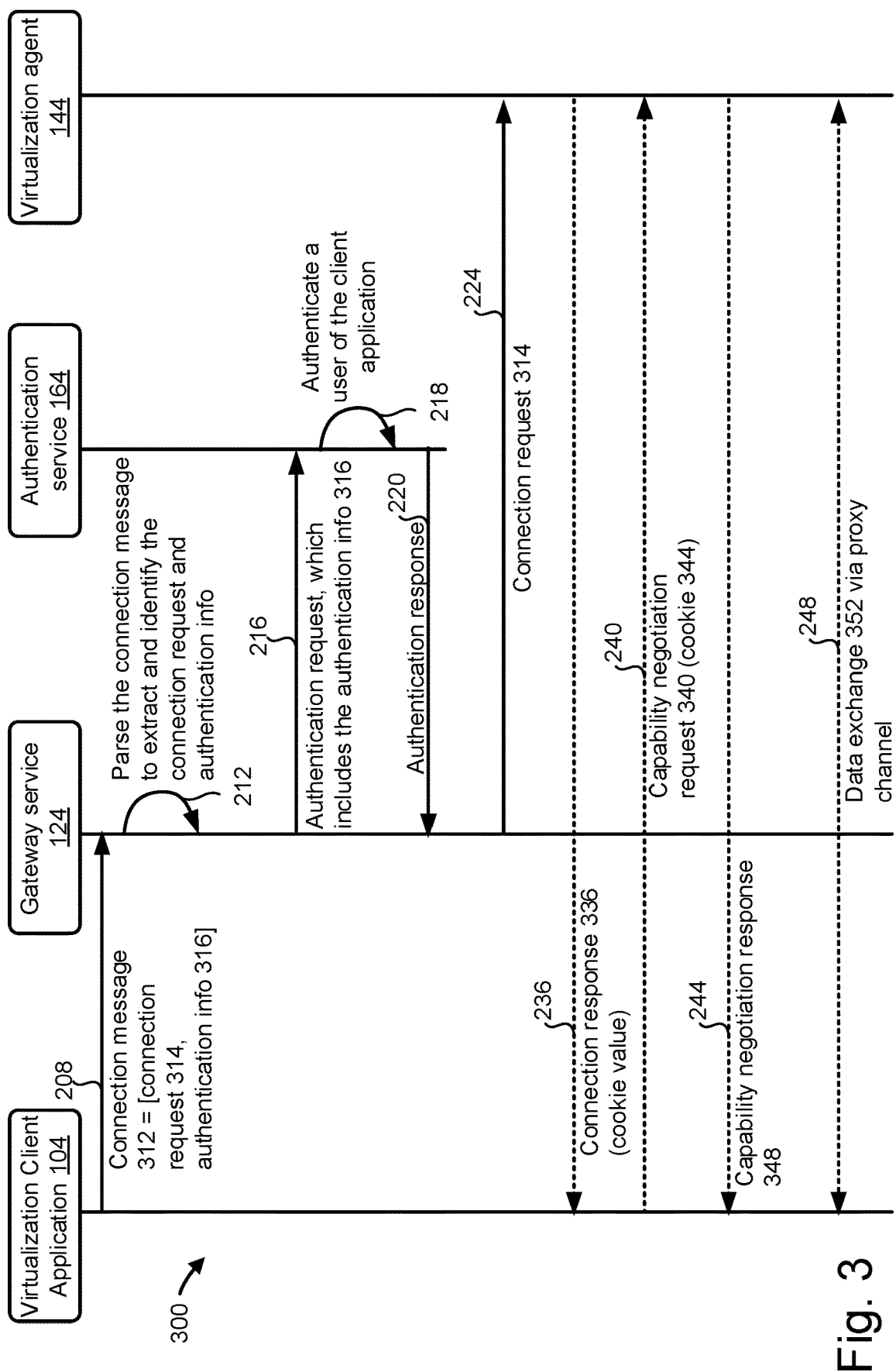
FIG. 3 is a sequence diagram that illustrates a connection process, in accordance with an example of the present disclosure.

FIG. 2 illustrates an example of connection process 200 executed by an enhanced VW connection establishment system, such as the system 100 of FIG. 1. FIG. 3 is a sequence diagram 300 that illustrates a connection process executed by an enhanced VW system, such as the system 100 of FIG. 1. As shown in FIGS. 2 and 3, the operations in the process 200 and the sequence diagram 300 are executed by the virtualization client application 104 within the client computing device 102 of FIG. 1, the gateway service 124 within the gateway computing device 122 of FIG. 1, the authentication service 164 within the authentication computing device 162 of FIG. 1, and the virtualization agent 144 within the server computing device 142 of FIG. 1. The process 200 and the sequence diagram 300 are discussed in unison.

Figure 4:
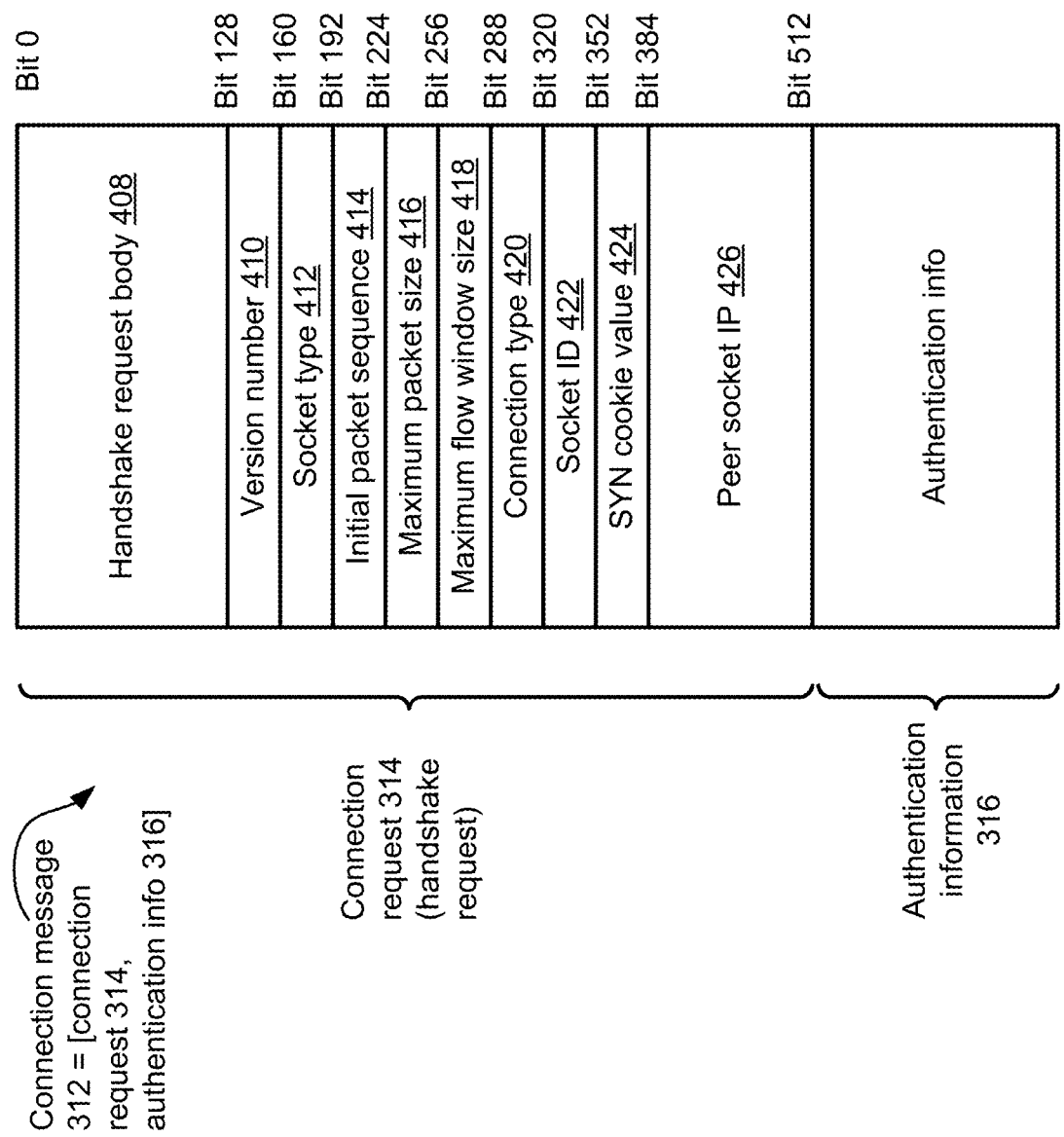
FIG. 4 illustrates an example of contents within a connection message, in accordance with an example of the present disclosure.

Referring to the process 200 of FIG. 2, at 204, the client application 104 (e.g., the connection message service 106 illustrated in FIG. 1) running on the client computing device 102 generates a connection message 312, where the connection message 312 is also illustrated in FIGS. 3 and 4. In some examples, the connection message 312 is a concatenation of a connection request 314 and authentication information 316. In some examples, the connection message 312 is to establish a connection (e.g., a communication channel) between the client application 104 and the virtualization agent 144. In some examples, the communication channel to be established is to use a first communication protocol.

FIG. 4 illustrates an example of contents within a connection message 312. For example, referring to FIG. 4, the connection message 312 is a concatenation of the connection request 314 and the authentication information 316. As will be discussed in further detail herein, the connection request 314 is to establish the communication channel between the client application 104 and the virtualization agent 144 using the first communication protocol. The authentication information 316 is used by the authentication service 164 to authenticate a user of the client application 104.

In some examples, the first communication protocol discussed with respect to 204 of the process 200 is the EDT protocol, which is based on UDT, as previously discussed herein. In some other examples, the first communication protocol is the UDP protocol or the UDT protocol. In some yet other examples, the first communication protocol is any other appropriate communication protocol, such as TCP.

Referring again to FIG. 4, in some examples where the first communication protocol is the EDT, UDT, or UDP protocol, the connection message 312 is a handshake message, and the connection request 314 is a handshake request. The handshake request is used to negotiate between the client application 104 and the virtualization agent 144, to establish the protocols of the communication link at the start of the communication. In an example, the handshake process usually takes place in order to establish rules for communication, when the client application 104 and the virtualization agent 144 attempt to communicate with each other. For example, the handshake process is used to negotiate parameters or attributes that are acceptable or compatible to the client application 104 and the virtualization agent 144 at both ends of the communication channel. Examples of such parameters or attributes negotiated during the handshake process are discussed in further detail herein in turn. The handshake request initiates the handshake process.

In FIG. 4, various example fields of the connection request 314 and their respective sizes are illustrated. These fields are configured to store values of various parameters or attributes. The fields of the connection request 314 and their respective sizes are merely examples, and do not limit the scope of this disclosure. Some example connection requests include different, additional, or fewer fields. Additionally, or alternatively, some example connection requests can include fields of different sizes compared to the fields illustrated in FIG. 4. In general, the connection request 314 at least in part includes a plurality of configuration parameters indicating communication capabilities of the client computing device 102.

As illustrated in FIG. 4, in some examples, the connection request 314 is a control packet for a handshake request. In some examples, the connection request 314 comprises 512 bits. Merely as an example, bits 0 to 128 of the connection request 314 comprise a handshake request body 408 that identifies that the connection request 314 is a handshake request for a UDP or UDT based protocol, such as for the EDT protocol.

In some examples, bits 129 to 160 of the connection request 314 identify one or more version numbers of a transport protocol supported by the client application 104 (labelled as "version number 410" in FIG. 4). Merely as an example, the version number 410 indicates a version number of the transport protocol supported by the client application 104.

In some examples, bits 161 to 192 of the connection request 314 identify a socket type of the client computing device 102 for the connection (labelled as "socket type 412" in FIG. 4). Merely as an example, the socket type 412 indicates one of various types of socket, such as stream, datagram, and/or raw, which are example socket types that may be supported by the client computing device 102.

In some examples, bits 193 to 224 of the connection request 314 identify an initial packet sequence for the connection (labelled as "initial packet sequence 414" in FIG. 4). For example, the initial packet sequence is a random or pseudo-random sequence number for a first data packet that the client application 104 will transmit to the virtualization agent 144 after establishment of the communication channel.

In some examples, bits 225 to 256 of the connection request 314 identify a maximum packet size that the client application 104 can support during communication using the first communication protocol (labelled as "maximum packet size 416" in FIG. 4). In some examples, the maximum packet size 416 is a Maximum Transmission Unit (MTU) size of an un-fragmented packet that the client application 104 can support.

In some examples, bits 257 to 288 of the connection request 314 identify a maximum flow window size that the client application 104 can support during communication using the first communication protocol (labelled as "maximum flow window size 418" in FIG. 4). In some examples, this is the maximum flow window size the client application 104 is allowed to have, and the window size may be limited by the sizes of data structures used for communication.

In some examples, bits 289 to 320 of the connection request 314 identify a connection type that the client application 104 desires to establish during communication using the first communication protocol (labelled as "connection type 420" in FIG. 4). Merely as an example, the EDT (or the underlying UDT and/or UDP) can support regular and/or rendezvous connection type, and the connection type 420 indicates whether the connection to be established is for regular or rendezvous connection type.

In some examples, bits 321 to 352 of the connection request 314 identify a socket identification (ID) of the client computing device 102 (labelled as "socket ID 422" in FIG. 4). In some examples where the first communication protocol is an EDT, UDT, or UDP, the socket ID is a UDP and/or UDT socket ID of the client computing device 102.

In some examples, bits 353 to 384 of the connection request 314 identify a value (e.g., a cookie value) for communication using the first communication protocol (labelled as "SYN cookie value 424" in FIG. 4). For example, this cookie value can be used to avoid a SYN flooding attack.

In some examples, bits 384 to 512 of the connection request 314 identify a peer socket Internet Protocol (IP) address for communication using the first communication protocol (labelled as "peer socket IP 426" in FIG. 4), which is the IP address of the client computing device 102.

As also illustrated in FIG. 4, the connection message 312 also comprises the authentication information 316. As illustrated, the authentication information 316 may be a control block that is appended to the connection request 314, to thereby form the connection message 312. In some examples, a size and/or contents of the authentication information block 316 can be implementation specific. In some examples, the authentication information block 316 includes a secure ticket or a token, such as an STA ticket, that can be validated by the authentication service 164. In some examples, the authentication information block 316 includes an authentication token that can be validated by the authentication service 164.

Referring again to FIG. 2, the process 200 proceeds from 204 to 208. At 208, the client application 104 transmits the connection message 312 to the gateway service 124. As discussed, in some examples, the connection message 312 is a handshake message that includes the connection request 314 (e.g., which is a handshake request in some examples) and the authentication information 316. The sequence diagram 300 of FIG. 3 also illustrates, at 208, transmission of the connection message 312 from the client application 104 to the gateway service 124.

Referring again to FIG. 2, the process 200 proceeds from 208 to 212. At 212, the gateway service 124 (e.g., the information extraction service 126 of FIG. 1) parses the connection message 312, to extract and identify the connection request 314 and authentication info 316. Thus, the gateway service 124 identifies the connection request 314 and authentication info 316 within the connection message 312. For example, where the connection message 312 is in accordance with FIG. 4, the information extraction service 126 replicates the first 512 bits of the connection message 312 to identify the connection request 314. Similarly, the information extraction service 126 replicates the remaining bits of the connection message 312 to identify the authentication info 316. In another example, where the connection message 312 is in accordance with FIG. 4, the information extraction service 126 removes the first 512 bits of the connection message 312 to identify the authentication info 316. Similarly, the information extraction service 126 removes the authentication info 316 from the connection message 312, to identify the connection request 314. The sequence diagram 300 of FIG. 3 also illustrates, at 212, parsing of the connection message 312 by the gateway service 124.

Referring again to FIG. 2, the process 200 proceeds from 212 to 216. At 216, the gateway service 124 (e.g., the authentication service 128 within the gateway service 124 of FIG. 1) transmits an authentication request to the authentication service 164 to authenticate the user of the client application 104, where the authentication request includes the authentication information 316. The sequence diagram 300 of FIG. 3 also illustrates, at 216, transmission of the authentication request from the gateway service 124 to the authentication service 164.

Referring again to FIG. 2, the process 200 proceeds from 216 to 218. At 218, the authentication service 164 validates the authentication information 316, thereby authenticating the user of the client application 104 (e.g., authenticating user credentials entered by the user of the client application 104). The sequence diagram 300 of FIG. 3 also illustrates, at 218, authentication of the user of the client application 104. As discussed, in some examples, the authentication service 164 is a STA service, and the authentication information block 316 includes a secure ticket, such as an STA ticket, although any other authentication protocol can be used. The authentication service 164 validates the STA ticket, to authenticate the user of the client application 104.

Referring again to FIG. 2, the process 200 proceeds from 218 to 220. At 220, the gateway service 124 receives an authentication response from the authentication service 164, the response confirming the authentication of the user of the client application 104. For example, the authentication service 164 validates the authentication information 316 included in the authentication request, and generates and transmits the authentication response to the gateway service 124. In some examples, the authentication response also includes identification of one or more server computing devices and/or identification of one or more virtualization agents (such as the virtualization agent 144) with which the client application 104 is to establish the communication channel. The sequence diagram 300 of FIG. 3 also illustrates, at 220, transmission of the authentication response from the authentication service 164 to the gateway service 124.

Referring again to FIG. 2, the process 200 proceeds from 220 to 224. At 224, the gateway service 124 transmits the connection request 314 (e.g., which the gateway service 124 extracted from the connection message 312 at 212) to the virtualization agent 144. As discussed with respect to FIG. 4, in some examples, the connection request 314 comprises a handshake request. Thus, the transmission of the connection request 314 to the virtualization agent 144 initiates the handshake process between the client application 104 and the virtualization agent 144.

Referring again to FIG. 2, the process 200 proceeds from 224 to 228. At 228, the virtualization agent 144 determines if the handshake process to communicate using the first communication protocol has failed. For example, as discussed with respect to FIG. 4, the connection request 314 includes a plurality of configuration parameters indicating communication capabilities of the client computing device 102. Some examples of such configuration parameters have been discussed with respect to FIG. 4. In some examples, the virtualization agent 144 may determine that one or more parameters are unsupported by the virtualization agent 144, in which case the virtualization agent 144 may determine that the virtualization agent 144 will be unable to effectively communicate with the client application 104 using the first communication protocol. Such situations may arise due to incompatibility between the virtualization agent 144 and the client application 104, because, merely as an example, the virtualization agent 144 and/or the client application 104 may have older or incompatible versions of software and/or firmware installed thereon. Additionally or alternatively, the incompatibility may also be due to hardware limitations in the client computing device 102 and/or the server computing device 142. In some other examples, the virtualization agent 144 may determine that communication using the first communication protocol is not currently desirable or effective, given the current operating conditions of the system 100 (e.g., given the load of the virtualization agent 144), and hence, the virtualization agent 144 may declare a handshake failure.

Thus, in some such examples discussed above, the virtualization agent 144 declares a failure in the handshake process. In case the virtualization agent 144 declares a failure in the handshake process, the process 200 moves from 228 to 232, where the communication system 100 falls-back and initiates communication using a second communication protocol. For instance, in some examples, the client application 104 and the virtualization agent 144 employ an adaptive transport technology for remote access. For example, the communication between the client application 104 and the agent 144 intelligently switches the underlying protocol between EDT and TCP. Merely as an example, the system 100 can be configured to use data transport over EDT as a primary protocol, with TCP as a fallback option. Thus, in some such examples, at 232, the system 100 falls back to communicate using TCP.

On the other hand, in case the virtualization agent 144 has not declared a failure in the handshake process, the process 200 moves from 228 to 236, where the virtualization agent 144 transmits a connection response 336 to the client application 104, via the gateway service 124. The sequence diagram 300 of FIG. 3 also illustrates, at 236, transmission of the connection response 336 from the virtualization agent 144 to the client application 104 via the gateway service 124. Note that during this transmission process and also during subsequent communication between the virtualization agent 144 and the client application 104, the gateway service 124 acts as a proxy. Communication between the virtualization agent 144 and the client application 104, where the gateway service 124 acts as a proxy, is illustrated using dotted lines in FIG. 3. Thus, the gateway service 124 (such as the proxy service 130 of FIG. 1) receives the connection response 336 from the virtualization agent 144, and forwards the connection response 336 to the client application 104.

In general, when a first and a second device communicate with each other via an intermediary device, the intermediary device can act as a proxy device in the communication. For example, when the first device wants to transmit a packet to the second device, the first device transmits the packet to the intermediary proxy device. The intermediary proxy device, in turn, forwards the packet to the second device. Similarly, when the second device wants to transmit another packet to the first device, the second device transmits the other packet to the intermediary proxy device, which then forwards the other packet to the first device. Thus, the intermediary device acts as a proxy device in the communication between the first and second devices, and communication between the first and second devices has to be via the intermediary proxy device. For example, the intermediary device acts as a proxy of the second device to the first device, and acts as a proxy of the first device to the second device. In the context of the system 100, the gateway service 124 acts as an intermediary proxy between the client application 104 and the virtualization agent 144. For example, during transmission of the connection response 336 from the virtualization agent 144 to the client application 104 via the gateway service 124, the gateway service 124 acts as an intermediary proxy. Thus, the virtualization agent 144 transmits the connection response 336 to the gateway service 124, and the gateway service 124 forwards the connection response 336 to the client application 104. The gateway service 124 acts as a proxy of the virtualization agent 144 to the client application 104, and acts as a proxy of the client application 104 to the virtualization agent 144.

For example, the virtualization agent 144 receives the connection request 314 that includes various fields 408-426, as discussed with respect to FIG. 4. In some examples, upon receiving the connection request 314, the virtualization agent 144 generates a cookie value. The cookie value, in some examples, is based on an IP address of the client computing device 102, and/or based on any other appropriate criteria, such as a secret key. In some examples, the connection response 336 includes the cookie value, which the virtualization agent 144 transmits to the client application 104.

Referring again to FIG. 2, the process 200 proceeds from 236 to 240. At 240, the client application 104 (e.g., the capability negotiation service 108 illustrated in FIG. 1) transmits a capability negotiation request 340 to the virtualization agent 144, via the gateway service 124. For example, the capability negotiation request 340 includes a cookie 344 (illustrated in FIG. 3) that is generated by the client application 104 in accordance with the cookie value included in the connection response 336. The sequence diagram 300 of FIG. 3 also illustrates, at 240, transmission of the capability negotiation request 340 from the client application 104 to the virtualization agent 144 via the gateway service 124. Again, the transmission is through the proxy channel, where the gateway service 124 acts as a proxy, and hence, the transmission is illustrated using a dotted line in FIG. 3. For example, the gateway service 124 (such as the proxy service 130 of FIG. 1) receives the capability negotiation request 340 from the client application 104, and forwards the capability negotiation request 340 to the virtualization agent 144.

Referring again to FIG. 2, the process 200 proceeds from 240 to 244. At 244, the virtualization agent 144 (e.g., the capability negotiation service 146 illustrated in FIG. 1) transmits a capability negotiation response 348 to the client application 104 via the gateway service 124. In some examples, the capability negotiation response 348 is in response to the capability negotiation request 340, and the capability negotiation response 348 includes one or more parameters for the channel to be established between the virtualization agent 144 and the client application 104, as discussed herein below. The sequence diagram 300 of FIG. 3 also illustrates, at 244, transmission of the capability negotiation response 348 from the virtualization agent 144 to the client application 104 via the gateway service 124. For example, when the virtualization agent 144 receives the cookie 344 within the capability negotiation request 340, the virtualization agent 144 compares the value of the cookie 344 with the value of the cookie included in the connection response 336. If the value of the cookie 344 matches with the value of the cookie included in the connection response 336, the virtualization agent 144 sets one or more parameters for communication with the client application 104 using the first communication protocol, and includes the parameters in the capability negotiation response 348. Examples of such parameters include, but are not limited to, a packet size, a maximum window size, a version number of the virtualization agent 144, an initial sequence number, and/or the like. In some examples, the initial sequence number is a random or pseudo-random sequence number for a first data packet that the virtualization agent 144 will transmit to the client application 104 after establishment of the communication link. The capability negotiation response 348 includes a confirmation that the cookie 344 is correct, and also includes the one or more parameters for communication between the virtualization agent 144 and the client application 104 using the first communication protocol. Again, the transmission of the capability negotiation response 348 is through the proxy channel, where the gateway service 124 acts as a proxy, and hence, the transmission is illustrated using a dotted line in FIG. 3.

Transmission of the capability negotiation response 348 completes the handshake process between the virtualization agent 144 and the client application 104 for communication using the first communication protocol, and now the virtualization agent 144 and the client application 104 are ready for data communication using the first communication protocol. During the handshake process, the gateway facilitates communication capability negotiation between the virtualization agent 144 and the client application 104. For example, as discussed with respect to process 200, the gateway forwards various messages, requests, and responses between the virtualization agent 144 and the client application 104, thereby facilitating the handshake process, which includes communication capability negotiation between the virtualization agent 144 and the client application 104.

Referring again to FIG. 2, the process 200 proceeds from 244 to 248, where the virtualization agent 144 and the client application 104 exchange data (labelled as data exchange 352 in FIG. 3) using the first communication protocol. The data exchange 352 is through the proxy channel, where the gateway service 124 acts as a proxy, and hence, is illustrated using a dotted line in FIG. 3. For example, during transmission of data from the virtualization agent 144 to the client application 104, the virtualization agent 144 transmits the data to the gateway service 124, which then forwards the data to the client application 104. Similarly, during transmission of data from the client application 104 to the virtualization agent 144, the client application 104 transmits the data to the gateway service 124, which then forwards the data to the virtualization agent 144.

Computing Platform for VW Systems

Figure 5:
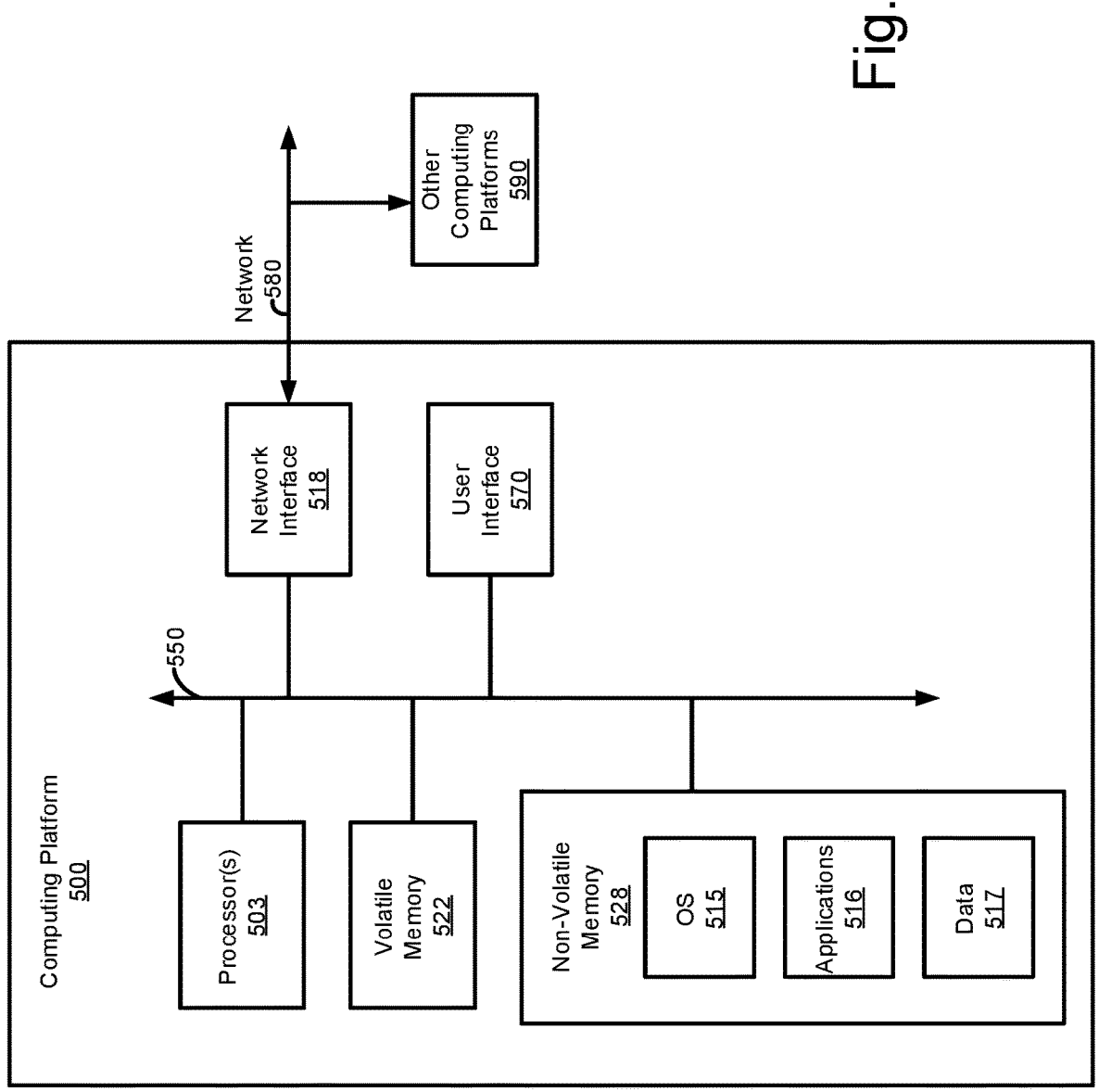
FIG. 5 is a block diagram of a computing platform configured to implement various VW systems and processes, in accordance with an example of the present disclosure.

FIG. 5 is a block diagram of a computing platform 500 configured to implement various VW systems and processes in accordance with examples disclosed herein.

The computing platform 500 includes one or more processor(s) 503, volatile memory 522 (e.g., random access memory (RAM)), non-volatile memory 528, a user interface (UI) 570, one or more network or communication interfaces 518, and a communications bus 550. The computing platform 500 may also be referred to as a computing device, an endpoint, a computer, or a computer system.

The non-volatile (non-transitory) memory 528 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 570 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.) and/or a software stack to drive such devices.

The non-volatile memory 528 stores an operating system 515, one or more applications or programs 516, and data 517. The operating system 515 and the application 516 include sequences of instructions that are encoded for execution by processor(s) 503. Execution of these instructions results in manipulated data. Prior to their execution, the instructions can be copied to the volatile memory 522. In some examples, the volatile memory 522 can include one or more types of RAM and/or a cache memory that can offer a faster response time than a main memory. Data can be entered through the user interface 570 or received from the other I/O device(s), such as the network interface 518. The various elements of the platform 500 described above can communicate with one another via the communications bus 550.

The illustrated computing platform 500 is shown merely as an example client computing device, an example server computing device, a gateway computing device, and/or an authentication computing device, as discussed with respect to the system 100 of FIG. 1, and can be implemented within any computing or processing environment with any type of physical or virtual machine or set of physical and virtual machines that can have suitable hardware and/or software capable of operating as described herein.

The processor(s) 503 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. In some examples, a processor can be configured to perform one or more operations by being coupled to a memory storing instructions executable by the processor to perform the one or more operations.

The processor(s) 503 can be analog, digital or mixed. In some examples, the processor(s) 503 can be one or more local or remote physical processors. A processor including multiple processor cores and/or multiple processors can provide functionality for parallel, simultaneous execution of instructions or for parallel, simultaneous execution of one instruction on more than one piece of data.

The network interfaces 518 can include one or more interfaces to enable the computing platform 500 to access a computer network 580 such as a Local Area Network (LAN), a Wide Area Network (WAN), a Personal Area Network (PAN), or the Internet through a variety of wired and/or wireless connections, including cellular connections and Bluetooth connections. For example, the network interfaces 518 can be used to access the networks 101 of the system 100 of FIG. 1. In some examples, the network 580 may allow for communication with other computing platforms 590, to enable distributed computing.

In described examples, the computing platform 500 can execute an application on behalf of a user of a client computing device. For example, the computing platform 500 can execute one or more virtual machines managed by a hypervisor. Each virtual machine can provide an execution session within which applications execute on behalf of a user or a client computing device, such as a hosted desktop session. The computing platform 500 can also execute a terminal services session to provide a hosted desktop environment. The computing platform 500 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A method comprising:
receiving, by a computing device, a message from a client device, the message including (a) a connection request to establish a connection between the client device and a server device and (b) authentication information;
extracting, by the computing device, the authentication information and the connection request from the message;
transmitting, by the computing device, the authentication information to an authentication service;
authenticating, by the authentication service, a user of the client device based on the authentication information;
transmitting, by the computing device subsequent to authenticating the user, the connection request to the server device;
forwarding, by the computing device subsequent to the transmission of the connection request to the server device, a connection response from the server device to the client device, wherein the connection response includes a cookie value;
forwarding, by the computing device, a capability negotiation request from the client device to the server device including a generated cookie based on the cookie value; and
forwarding, by the computing device, a capability negotiation response from the server device to the client device, the capability negotiation response including one or more parameters associated with the connection between the client device and the server device.

2. The method of claim 1, wherein: the connection request is a handshake request, with the authentication information included in a control block that is appended to the handshake request.

3. The method of claim 1,
wherein the computing device is a gateway, and
wherein the method comprises:
establishing the connection between the client device and the server device, and
exchanging, subsequent to establishment of the connection, data between the client device and the server device via the gateway over the connection, such that the gateway acts as a proxy in the connection between the client device and the server device.

4. The method of claim 1, further comprising, subsequent to transmitting the connection request to the server device, receiving, by the computing device, the connection response from the server device.

5. The method of claim 4, wherein the cookie is generated by the client device.

6. The method of claim 1, further comprising facilitating communication capability negotiation between the client device and the server device.

7. The method of claim 1, wherein the connection request comprises one or more of:
a request body specifying that the connection request is a handshake request,
a field storing a value specifying one or more version numbers of a transport protocol supported by the client device,
a field storing a value specifying a socket type of the client device,
a field storing a value specifying an initial packet sequence,
a field storing a value specifying a maximum packet size supported by the client device,
a field storing a value specifying a maximum flow window size supported by the client device,
a field storing a value specifying a connection type supported by the client device,
a field storing a value specifying a socket in the client device,
a field storing a value specifying the cookie, and
a field storing a value specifying an Internet Protocol (IP) address of a socket in the client device.

8. The method of claim 1, wherein authenticating the client device comprises:
receiving, by the computing device and from the authentication service, an authentication response confirming authentication of the client device.

9. The method of claim 1, wherein a virtualization agent being executed within the server device and a virtualization client application being executed within the client device is to communicate over the connection, to maintain a virtual workspace within the client device.

10. The method of claim 1, wherein:
the connection request comprises a first number of bits of the message;
the authentication information comprises a second number of bits of the message;
the first number and the second number are positive integers; and
extracting the authentication information and the connection request from the message comprises removing the second number of bits from the message.

11. The method of claim 1, wherein the connection is based on a transport protocol comprising User Datagram Protocol-based Data Transfer Protocol.

12. The method of claim 1, wherein the connection is based on Enlightened Data Transport protocol.

13. A client device comprising:
a network interface;
a memory to store instructions; and
one or more processors coupled to the memory and the network interface, the one or more processors configured to
generate a handshake message that comprises (i) a handshake request to establish a connection, and (ii) a control block appended to the handshake request, the control block including an authentication token,
cause transmission of the handshake message, including the handshake request and the control block, to a gateway device,
receive, from the gateway device, a connection response that includes a cookie value,
generate a cookie based on the cookie value, and
cause transmission of a capability negotiation request to the gateway device, the capability negotiation request including the cookie;
wherein the gateway device comprises another network interface, another memory, and another one or more processors coupled to the another network interface and the another memory;
wherein the another one or more processors of the gateway device are configured to extract the authentication token and the handshake request from the handshake message, and to further transmit the authentication token to an authentication service; and
wherein the authentication service authenticates a user of the client device based on the authentication token.

14. The computer system of claim 13, wherein the another one or more processors of the gateway device are configured to
receive the handshake message from the client device,
receive a response from the authentication service authenticating the user of the client device,
cause transmission of the handshake request from the handshake message to a server device,
receive a handshake response from the server device, and
cause transmission of the handshake response to the client device.

15. The computer system of claim 14, wherein the another one or more processors of the gateway device are configured to: establish, subsequent to transmission of the handshake response to the client device, a proxy channel between the client device and the server device for communication between the client device and the server device.

16. The computer system of claim 15, wherein the server device and the client device communicate over the proxy channel via the gateway device.

17. The computer system of claim 13, wherein the handshake request comprises one or more of:
a request body identifying the handshake request,
a field storing a value specifying one or more version numbers of a transport protocol supported by the client device,
a field storing a value specifying a socket type of the client device,
a field storing a value specifying an initial packet sequence,
a field storing a value specifying a maximum packet size supported by the client device,
a field storing a value specifying a maximum flow window size supported by the client device,
a field storing a value specifying a connection type supported by the client device,
a field storing a value specifying a socket in the client device,
a field storing a value specifying the cookie, and
a field storing a value specifying an Internet Protocol (IP) address of a socket in the client device.

18. A non-transitory computer readable medium storing processor executable instructions to establish a communication channel between a first device and a second device, the instructions comprising instructions to:
receive, from the first device, a control packet comprising (i) a first section including one or more parameters of the first device for establishing the communication channel, and (ii) a second section including an authentication token;
extract the authentication token from the control packet;
cause transmission of the authentication token to an authentication device;
receive a response from the authentication device confirming an authentication;
transmit a connection request to the second device;
receive a connection response from the second device including a cookie value;
cause transmission of a capability negotiation request to the second device including a cookie generated by the first device based on the cookie value; and
cause transmission of the one or more parameters of the first device to the second device.

19. The non-transitory computer readable medium of claim 18, wherein the control packet is a first control packet, and wherein the instructions further comprise instructions to:
receive a second control packet from the second device, in response to transmission of the one or more parameters to the second device; and
cause transmission of the second control packet to the first device.

20. The non-transitory computer readable medium of claim 19,
wherein the non-transitory computer readable medium is included in a computing device, and
wherein the instructions further comprise instructions to:
establish the communication channel between the first device and the second device, with the computing device acting as a proxy between the first and second devices, to forward data between the first and second devices over the communication channel.

* * * * *